United States Patent [19]
Pierart

[11] 3,755,647
[45] Aug. 28, 1973

[54] METHOD FOR MAKING A TUBULAR STRUCTURE

[75] Inventor: Robert M. Pierart, Saint-Nazaire, France

[73] Assignee: Babcock-Atlantique, Paris, France

[22] Filed: Feb. 17, 1972

[21] Appl. No.: 227,689

[30] Foreign Application Priority Data

Mar. 30, 1971 France..........................7111049

[52] U.S. Cl.................. 219/126, 219/60 R, 219/73, 29/481
[51] Int. Cl............................................... B23k 9/12
[58] Field of Search...................... 219/59, 60 R, 61, 219/73, 137; 29/481, 480

[56] References Cited
UNITED STATES PATENTS

| 3,238,610 | 3/1966 | Berg................................. 29/481 X |
| 2,887,771 | 5/1959 | Holdman et al. ................. 29/481 X |
| 2,322,021 | 6/1943 | Hengstler......................... 29/481 X |

*Primary Examiner*—E. A. Goldberg
*Assistant Examiner*—L. A. Schutzman
*Attorney*—J. Maguire

[57] ABSTRACT

This invention is a simple and easy method for making tubular structures of substantial thickness in an effective and efficient manner.

7 Claims, 8 Drawing Figures

PATENTED AUG 28 1973 3,755,647

FIG. 6
FIG. 8
FIG. 7
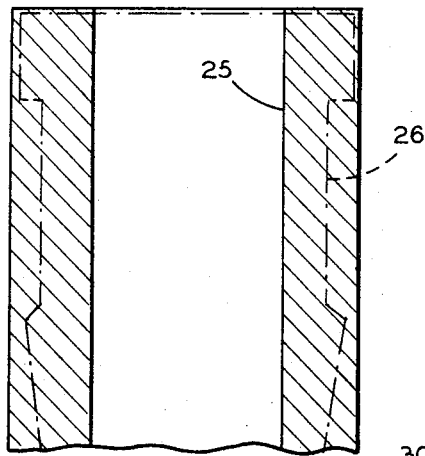
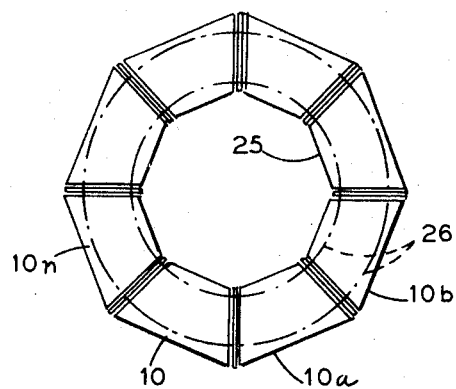
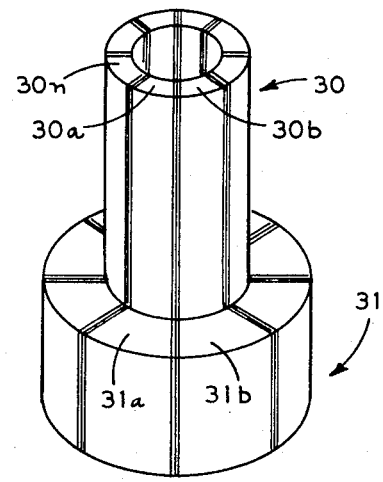

METHOD FOR MAKING A TUBULAR STRUCTURE

This invention relates to a method of fabricating tubular structures of substantial thickness.

More particularly, this invention relates to the fabrication of very thick tubular pieces or structures involving fusible-electrode welding.

In present day practice, methods of making parts of great thickness include forging or use of other large equipment. However, there are structures to be made which are not amenable to the use of such equipment.

What is needed in the art is a method of making tubular structures of substantial thickness without the need for the use of high cost, large-scale equipment and excessive electrical power.

The present invention answers the needs of the art with special emphasis on the use of a simplified and conventional method and tools which of course lower the cost of the structures obtained which is quite advantageous. As a result, the cost of the structure obtained by the method of the present invention is lowered in substantial proportion, particularly in view of the simplified embodiment, and of the tools which are conventional.

One of the objects of the present invention is a method of making tubular structures.

Another object is a method of fabricating tubes or other large pieces with thick walls, which leads to the elimination of extremely long delivery time for the finished product.

Other objects and many of the attendant advantages thereof will become apparent to one skilled in the art from a reading of the following detailed specification taken with the accompanying drawings wherein:

FIG. 6 is a view in axial section of this structure, in which the profile of a nozzle has been sketched.

FIG. 7 is a corresponding plan view, and

FIG. 8 shows, as a variant, a flange produced according to the invention.

In accordance with the subject invention, the method of making a tubular structure is characterised essentially in that elementary sectors, advantageously of trapezoidal section, delimited by two parallel, plane faces, a large one and a small one, and by two cut faces, are cut out, then the sectors are welded together, the operation of welding two sectors consisting in placing the two large faces along the two planes of a dihedral angle, bringing together the two respective cut surfaces, leaving a space between them, placing an electrode with a fusible wire-guide in the space, closing this space, causing the fusion of the said electrode from the bottom upward, as well as that of a wire of addition fed at the desired speed in order to fill the said space, the said tubular piece embodied being delimited by two polygonal surfaces, exterior and interior respectively, formed by the large and small faces of the constituent sectors.

In general, the method of welding with fusible electrodes, known in itself, and briefly reviewed below, consists in disposing and temporarily fastening two elementary pieces to be assembled, in such a way, that their respective welding surfaces together form a predetermined space between which a composite welding electrode is placed. Such an electrode generally consists of bars of addition metal joined by fusible wire-guide tubes welded to the above bars, and in which the wire of addition is threaded and paid out at a suitable speed from a device situated above the pieces to be assembled, and the welding is done vertically upward.

According to the invention, in order to fashion a tubular structure with a very thick wall, elementary sectors 10 (FIG. 1) are prepared, so that they have a trapezoidal form, for example, in cross section, with a large face 11, a small face 12, and sides 13 and 14.

Figure 1:
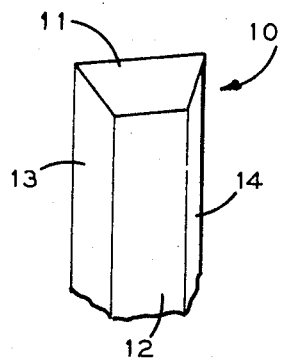
FIG. 1 illustrates in perspective, an elementary sector.
Figure 2:
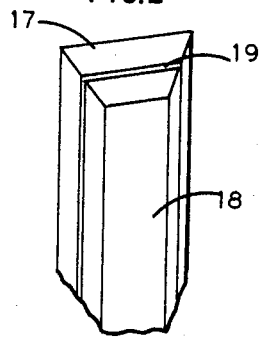
FIG. 2 shows a variant of an elementary sector.

This elementary sector, as illustrated in FIG. 1, can be obtained by cutting from a sheet, and by assembly of at least two elements 17, 18, as seen in FIG. 2, joined by weld 19 by the known fusible-electrode process. Any thickness, even a very great one, can thus be obtained.

Figure 3:
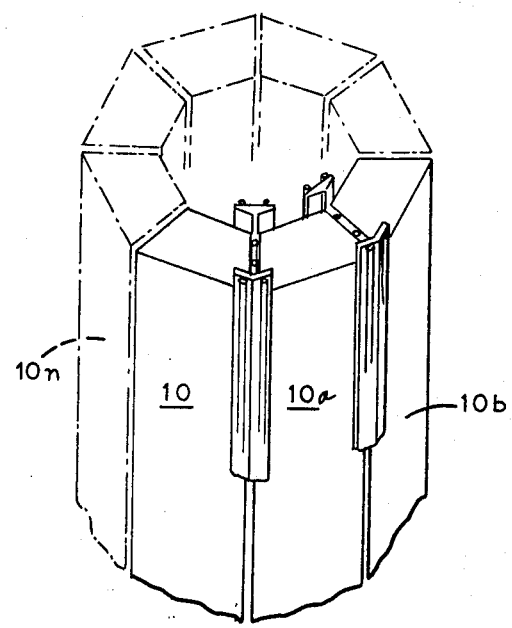
FIG. 3 shows, likewise in perspective, a phase of construction of a tubular structure.
Figure 4:
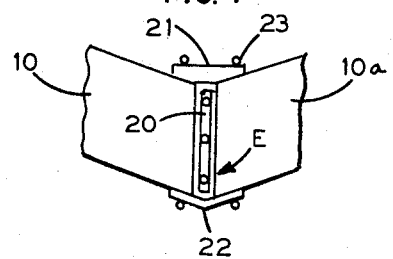
FIG. 4 is a partial view, in plan, of a fusible electrode in place in the space comprised between two elementary sectors to be assembled.

To fashion a tubular structure, elementary sectors 10, 10a . . ., 10n (FIG. 3) are placed in a circle in such a way as to form a space "E" between two consecutive sides, and each space is equipped with a fusible electrode, indicated in its entirety by 20 in FIG. 4, while sealing bands 21, 22 with cooling means 23, close space E laterally.

Figure 5:
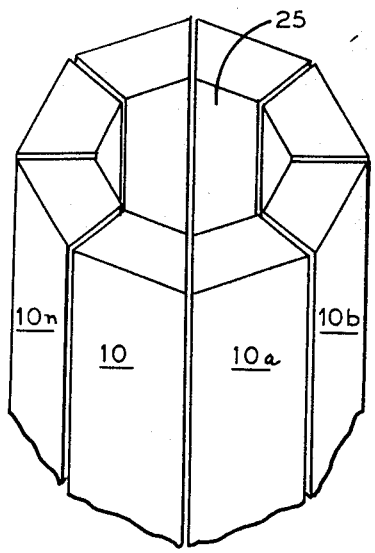
FIG. 5 shows the tubular structure obtained.

When this preparatory phase is completed, we can proceed with the welding of the elementary sectors by welding the sectors one after the other, or two by two, or perhaps, all the sectors simultaneously. After welding all the elementary sectors, the tubular structure appears as indicated in FIGS. 5 to 7, for example, composed of eight elementary sectors. Such a structure can then be stress relieved, followed by forging or hammering. For this purpose the tubular structure will be, for example, engaged with its axial passage 25 on a rotary support mandrel.

It should be noted that the foregoing operation is advantageously carried out in such a way as to constitute a blank, see, in particular, FIGS. 6 and 7, following which, suitable machining will produce the profile desired for the structure, as illustrated, for example, by the dashes 26 in the above-said figures.

With such a manufacturing process, the embodiment of structures with a generally frusto-conical shape, not shown here, can be envisaged, by starting with suitably cut components. As clearly shown in FIG. 8, it is also possible to form a nozzle 30 from a plurality of sectors, 30a, 30b . . ., 30n welded by fusible electrode; the said nozzle being provided with a thick flange indicated as a whole at 31, which is also obtained by starting with a plurality of elementary sectors 31a, 31b . . . 31n joined by fusible-electrode welds. In any case, the invention is not, of course, limited to the forms of embodiment selected and illustrated, which can, on the contrary, be subjected to diverse variations.

The subject invention is a method of making tubular structures of substantial thickness by assembling elementary sections one after the other to form the final thick tubular structure without the need or use for large-scale mechanical equipment and large amounts of electric power.

What is claimed is:

1. A method of fabricating a tubular wall structure comprising a plurality of upright weld-united quadrilateral prism shaped sectors including the steps of:
   cutting each one of a pair of opposing sides in each of the sectors along divergent planes,
   positioning the sectors to form the tubular wall by having corresponding cut sides abutting in spaced parallel relation to one another,
   inserting a fusible electrode in each of the spaces between the sectors,
   striking an arc at the lower end of said electrode, and causing the fusion of the electrode to fill said space thereby weld-uniting the sectors.

2. A method according to claim 1 including the step of closing the side boundaries of each of said spaces during the welding process.

3. A method according to claim 1 including the step of cooling the side boundaries of each of said spaces during the welding process.

4. A method according to claim 1 including the step of simultaneously striking an arc at the lower end of each of said electrodes.

5. A method according to claim 1 including the step of feeding additional fusible metal into each of said spaces during the fusing of the electrode contained therein.

6. A method according to claim 1 including the step of laminously weld-uniting a plurality of sheets to form each of said sectors.

7. A method according to claim 1 including the step of machining the interior and exterior surfaces of said tubular structure to achieve a cylindrical configuration.

* * * * *